Oct. 15, 1957     M. L. EDWARDS     2,809,708
VEHICLE SPEED LIMITING DEVICE WITH MANUAL OVERRIDE MEANS
Filed Aug. 16, 1954     2 Sheets-Sheet 1
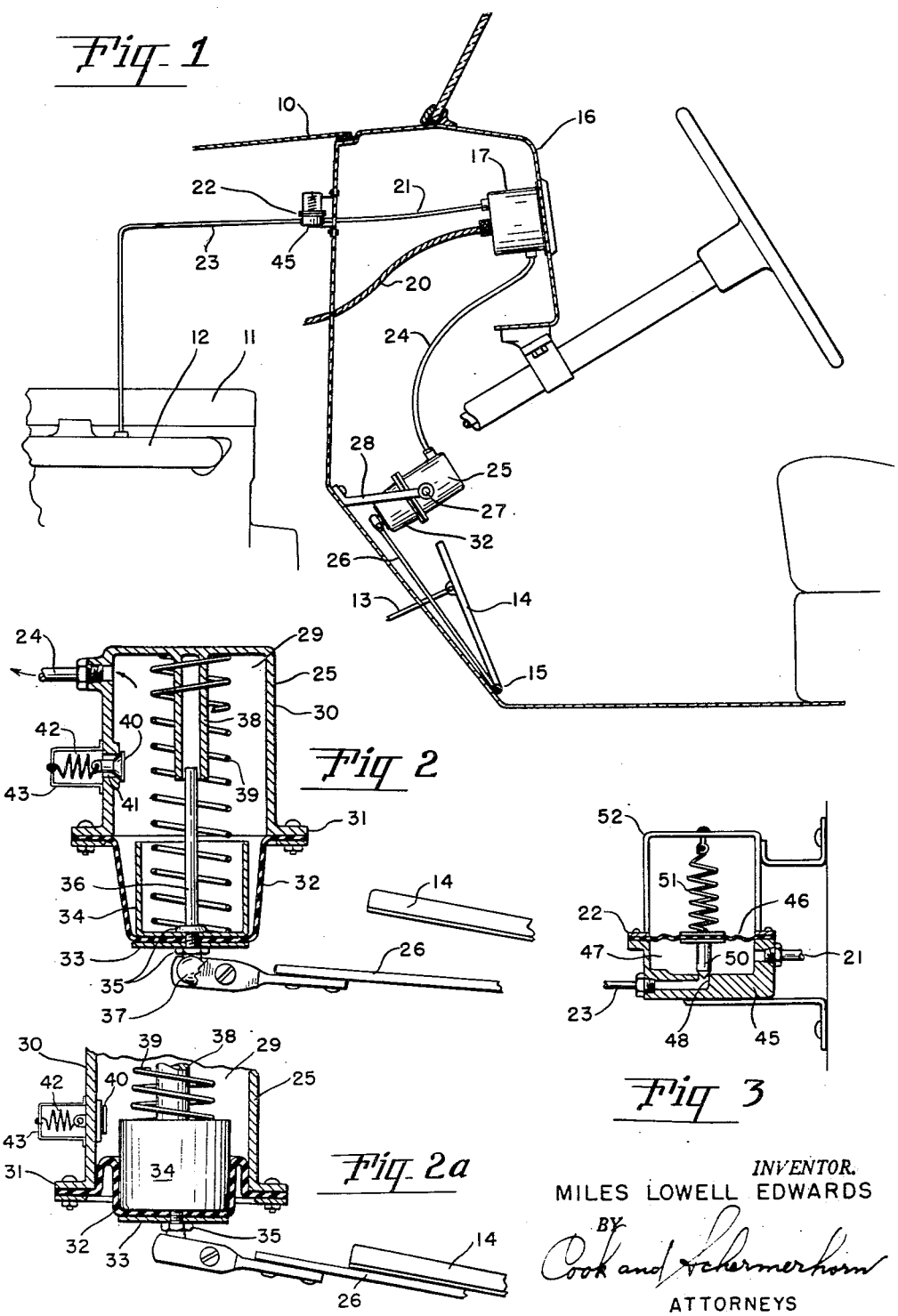
INVENTOR.
MILES LOWELL EDWARDS
BY
Cook and Schermerhorn
ATTORNEYS Oct. 15, 1957  M. L. EDWARDS  2,809,708
VEHICLE SPEED LIMITING DEVICE WITH MANUAL OVERRIDE MEANS
Filed Aug. 16, 1954  2 Sheets-Sheet 2
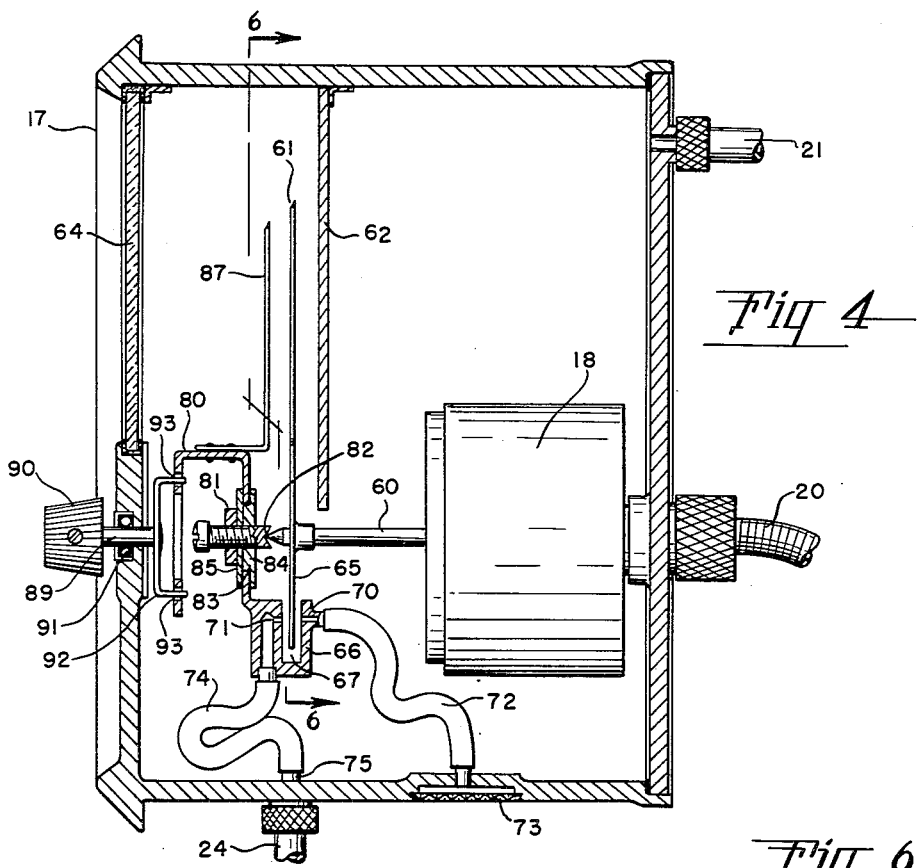
Fig. 4
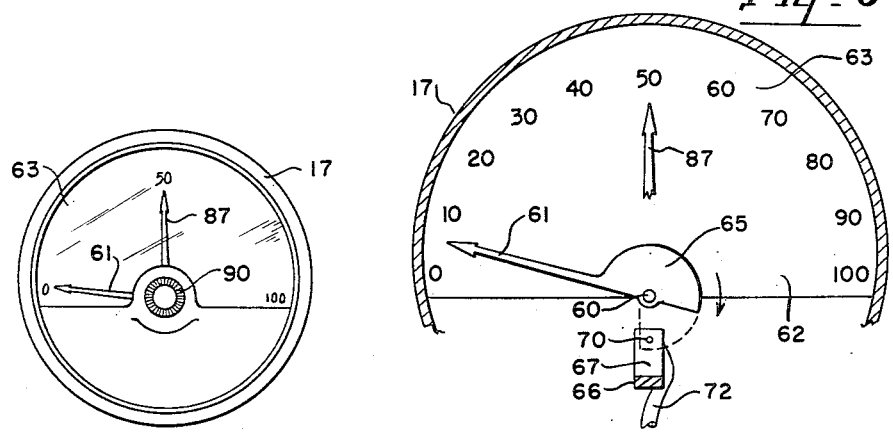
Fig. 5
Fig. 6
INVENTOR.
MILES LOWELL EDWARDS
BY
Cook and Schermerhorn
ATTORNEYS

United States Patent Office 2,809,708
Patented Oct. 15, 1957

2,809,708

VEHICLE SPEED LIMITING DEVICE WITH MANUAL OVERRIDE MEANS

Miles Lowell Edwards, Portland, Oreg.

Application August 16, 1954, Serial No. 450,050

5 Claims. (Cl. 180—82.1)

This invention relates, in general, to an improved governor type of device for limiting the operation of a machine with respect to some variable effect or result, and has particular reference to a speed limiting device.

In an engine driven vehicle such as an automobile, boat or aircraft, it is often desired to limit the speed to some value well below the capability of the engine. The imposition of such a limitation is frequently temporary, but the interval of such limitation may be of either long or short duration. In a boat or aircraft, for example, the selected speed limitation may correspond to a desired cruising speed on a particular leg of a course, and the criterion may be the engine speed indicated by a tachometer, rather than the actual water or air speed. In the case of an automobile, it may be desired to impose a relatively high speed limit for country driving, and then reduce the speed limit to a lower value from time to time in passing through cities, towns and other restricted zones. Also, after an engine overhaul, it may be desirable to impose an arbitrary limit on the speed of the engine during the breaking-in period.

Conventional governor mechanisms have heretofore been proposed for such purpose, but have never gained public acceptance because of numerous shortcomings and disadvantages. Such governors are mounted directly on the engine and are designed to discourage adjustment by the driver. Even if the adjustment were not difficult, it would be necessary to stop the vehicle, get out and reach under the hood of the engine in order to alter the speed setting.

Furthermore, the conventional governor may be extremely dangerous on an automobile because it prevents excess speed which may be temporarily necessary to avert danger in certain situations. It prevents the operator from exerting complete control over the vehicle at times when human judgment may be necessary for safe driving. In effect, it overrides and limits the control of the operator.

The general object of the present invention is, therefore, to provide an improved device for limiting the operation of a machine with respect to some variable effect or result produced by the machine.

A more specific object is to provide a governor type of device for limiting the speed of a machine without depriving the operator of complete control over the machine.

Other objects are to provide a speed limiting device for automotive use which may be adjusted conveniently by the driver and which may be overpowered by the driver without any adjustment in an emergency, to provide a device of the type described wherein the principal component of the mechanism can be incorporated in a speedometer or tachometer, to provide a device of the type described having pneumatic components, to provide an improved pneumatic servo-motor, and to provide a device of the type described which is simple and inexpensive to manufacture and rugged and reliable in operation.

The illustrated embodiment of the present device comprises a sensing unit incorporated in a speedometer or tachometer to produce a control signal at a predetermined indicated speed. By so locating the speed responsive unit on the speedometer instead of on the engine of a vehicle, convenient means of adjustment may be provided directly on the speedometer face, whereby the speed limit at which the device becomes effective may be changed from time to time, as desired, without requiring the operator to stop the vehicle or leave the driver's seat.

The functioning of the present device differs from that of the conventional governor in that it does not override the control of the operator, but merely interposes a resilient stop in the path of movement of the throttle lever or foot accelerator pedal forcibly to warn the operator that he is exceeding the speed for which the device is set, without making it impossible for him to exceed such speed. The theory of operation of the present device, particularly as it is constructed for automotive use, is predicated upon the assumption that the average driver is a good citizen who does not intentionally drive at excessive speeds, but is often careless in controlling the great reserve of power available in the modern automobile, and consequently may drive too fast, particularly in the city, merely because of preoccupation with other thoughts, conversation with companions, or for other diverting reasons.

It is also assumed that the average driver, being a good citizen, is desirous of abiding by the various legally imposed speed restrictions on highways and city streets, and would welcome the assistance of a driving aid which would warn him of a speed violation in a manner that could not escape his attention but which would not deprive him of complete control of the vehicle at all times. Thus, the present device performs its warning and control effect by exerting a firm uplift force against the driver's throttle foot when the designated speed is exceeded and by removing such force as soon as the speed falls below the designated value. By applying such warning to the driver's throttle foot, it cannot go unheeded as is often the case with signal lights or other visible or audible indicators which have heretofore been mounted on the instrument panel for such purpose. On the other hand, should an emergency arise, the driver can without moving any part of his body other than his throttle foot, immediately forcibly depress the throttle pedal and utilize the full power of the engine.

These and other objects and advantages will become apparent and the invention will be better understood with reference to the following description of a preferred form of the invention as illustrated on the accompanying drawings. Various changes may be made in the construction and arrangement of parts and the invention is to be limited only by the terms of the appended claims.

In the drawings:

Figure 1 is a fragmentary sectional view of an automobile showing the installation of the present invention;

Figure 2 is a sectional view showing the pneumatic servo unit and throttle stop in normal position;

Figure 2a is a view similar to Figure 2, showing the parts in actuated position at excessive speed;

Figure 3 is a sectional view of the air pressure regulating valve shown in Figure 1;

Figure 4 is a sectional view of the speedometer housing shown in Figure 1;

Figure 5 is a front elevation view of the speedometer shown in Figure 4; and

Figure 6 is a fragmentary view of the speedometer taken on the line 6—6 of Figure 4.

In Figure 1, the automobile 10 is equipped with an internal combustion engine 11 having an intake manifold 12. The air pressure in manifold 12 normally fluctuates in a range of values considerably below atmospheric pressure by the operation of the engine. The engine is equipped with a throttle valve, not shown, which may be opened and closed to control the operating speed by means of a throttle rod 13 connected with a foot throttle pedal 14 which is pivotally connected at 15 with the floor of the vehicle. Pedal 14 is in idling position in Figure 1 and is movable toward the floor to increase the speed of the engine. The foregoing elements are parts of conventional automobile construction.

On the instrument panel 16 is a special housing 17 for the tachometer mechanism 18 of a speedometer as shown in Figure 4. The tachometer mechanism 18 is operated by a conventional flexible speedometer cable 20 driven by a gear on the drive shaft of the vehicle. Cable 20 may be connected directly with the engine in installations where road speed is not the desired criterion. The housing 17 is made substantially airtight, and the construction of the conventional speedometer cable 20 is such that only a negligible amount of air is admitted through this cable when the housing 17 is partially evacuated. Special sealing means may be provided for the speedometer cable connection, if necessary.

Air is continuously withdrawn from the housing 17 through a pneumatic conduit 21 connected with a pressure regulating valve unit 22. The source of vacuum for the system comprises a pneumatic conduit 23 connected with the intake manifold 12 of the engine. Valve unit 22 may be made sufficiently small to be incorporated in speedometer housing 17, if desired. Air is also continuously admitted to housing 17 in a manner which will presently be described. The function of pressure regulating unit 22, as will presently appear, is to maintain a constant predetermined air pressure in housing 17 a few pounds below atmospheric.

A pneumatic conduit 24 extends from the speedometer housing 17 to a pneumatic servo-motor unit 25 which is connected with throttle stop 26. Throttle stop 26 comprises a flat bar which underlies the throttle pedal 14 and is pivotally connected with the pedal mounting 15. Thus, when the stop 26 occupies its normal position shown in Figure 1, the throttle pedal 14 is capable of its full range of movement to open the engine throttle, but when the throttle stop is raised substantially into engagement with the underside of the pedal 14 when the latter is in its normal idling position, as shown in Figure 2a, the pedal 14 cannot be depressed to open the throttle without moving stop 26 ahead of it. It will subsequently be explained that throttle stop 26 also functions as a yieldable throttle closing device to prevent over-speednig of the vehicle or engine, as the case may be.

Servo-motor 25 comprises a cylindrical metal cup housing 30 having a rim flange 31 for securing the periphery of a flexible cup-shaped diaphragm 32 to enclose an air chamber 29. Housing 30 is equipped with trunnions 27 mounted in a forked bracket 28 secured to the floor of the vehicle. The central portion of diaphragm 32 is clamped between an exterior plate 33 and the end of an interior metal cup 34. The cylindrical side wall of cup 34 provides a supporting surface for the extended diaphragm material in its Figure 2 position when the air pressure in chamber 29 is suddenly reduced below atmospheric. The diameter of the cylindrical skirt of cup 34 is somewhat less than the diameter of housing 30 to allow space between the two members for the diaphragm as the diaphragm and cup 34 are drawn into housing 30. The space between cup 34 and housing 30 should exceed twice the thickness of the diaphragm material so that the latter can roll freely into and out of the housing 30 in its movements between its Figure 2 and Figure 2a positions. In all positions of cup 34 the major portion of the diaphragm material is supported against exterior atmospheric pressure.

The central portion of the diaphragm 32 is clamped between plate 33 and cup 34 by suitable abutment means 35 on a guide rod 36. Guide rod 36 has an outer end equipped with a ball 37, or other suitable articulating joint, for connection with the free end of throttle stop 26. The inner end of guide rod 36 slides in a central guide tube 38 mounted in the end of the housing 30. A compression spring 39 normally holds the diaphragm 32 extended outwardly from the housing 30, as shown in Figure 2, but this spring is of such strength that it will be overpowered by exterior atmospheric pressure when the air pressure in chamber 29 is reduced to a predetermined value by reason of the withdrawal of air through the conduit 24.

This novel form of construction provides a vacuum servo unit of compact size having a relatively long stroke with a diaphragm of light flexible material which is amply supported against atmospheric pressure.

A valve 40 permits air to be drawn into the chamber 29 through a port 41 when the throttle stop 26 in its Figure 2a position is suddenly overpowered by forcible depression of the accelerator pedal 14. The valve 40 is normally held closed by a tension spring 42 having its outer end anchored on a bracket 43. Spring 42 is strong enough to hold the valve closed against the greatest differential of pressure that may occur between the chamber 29 and atmosphere by reason of the exhaustion of air through conduit 24. When throttle stop 26 is suddenly depressed by the driver the pressure in chamber 29 temporarily falls to a lower value which pulls the valve 40 open momentarily.

Figure 3 illustrates the pressure regulating valve unit 22 for the pneumatic system. A hollow cup-shaped body member 45 is closed on its open side by a diaphragm 46 to define a diaphragm chamber 47. In the operation of the system air is continuously admitted to chamber 47 at a slow rate through conduit 21 and withdrawn by means of the suction conduit 23. Conduit 23 is connected with a port 48 which may be opened and closed in varying degree by a valve member 50 connected with the diaphragm 46. Valve 50 has a tapered conical end to provide an effective metering or throttling action in response to movement resulting from deflection of the diaphragm. The diaphragm is drawn outwardly relative to the chamber 47 by a tension spring 51 having its other end anchored on the bracket 52.

The tension of spring 51 is adjusted to maintain a constant predetermined subatmospheric value of air pressure in the chamber 47. Air enters the chamber 47 through pipe 21 at a variable rate under certain conditions of operation and the degree of suction applied by the conduit 23 varies with the operation of the engine. The pressure in intake manifold 12 varies between a fairly high degree of vacuum to some intermediate value which is considerably below atmospheric pressure. The purpose of the pressure regulating valve 22 is to eliminate such variables and maintain a fairly constant pressure in chamber 27 of a value slightly higher than the maximum absolute pressure which can occur in the manifold 12 while the engine is running. When the pressure in chamber 47 starts to drop below such value, the weight of atmospheric pressure on the outside of diaphragm 46 closes the valve 50 until the incoming air through conduit 21 reestablishes the desired pressure in chamber 47. When the pressure in chamber 47 tends to exceed the desired value, the diaphragm 46 is deflected outwardly (upwardly in Figure 3) causing the valve 50 to open and allow air to be withdrawn through the port 48. Under stable conditions the valve 50 becomes poised in an equilibrium throttling position. Thus the pressure regulating device 22 operates to maintain a fairly constant pressure a few pounds below atmospheric in the housing 17 under all operating conditions.

Referring now to Figures 4, 5 and 6, a shaft 60 extends from the tachometer mechanism 18 carrying a speed indicating pointer 61. Mounted in the housing 17 behind the pointer 61 is a plate 62 carrying a speedometer dial 63. This pointer and dial are visible through a window 64 in the front of the housing.

The pointer 61 is equipped with a semicircular vane 65. The numeral 66 designates a sensing unit which cooperates with the vane 65. The unit 66 comprises a U-shaped body member having a gap or slot 67 to admit a portion of the vane 65. On one side of the slot 67 is a nozzle orifice 70 and aligned therewith on the opposite side of the slot is a receiving orifice 71. Nozzle 70 is connected with a flexible tube 72 communicating with an inlet filter 73 in a wall of the housing 17. Receiving orifice 71 is connected with a flexible tube 74 communicating with a connection 75 for the pneumatic conduit 24.

Sensing unit 66 is mounted on a frame 80 for rotation about the axis of shaft 60. A stationary cross bar 81 extends horizontally across the housing 17 and is equipped with an adjustable screw 82 having a pivot bearing for the end of shaft 60. The frame 80 has a circular opening 83 to receive the small portion of a shouldered nut 84 in abutting relation with a flat washer 85 whereby the nut and washer combination forms a supporting bearing for the frame 80 in axial alignment with the shaft 60. Attached to the frame 80 is a pointer 87 which is also movable over the dial 63. A shaft 89 equipped with a knob 90 is mounted for rotation in the front wall of housing 17 and equipped with a sealing ring 91. The inner end of shaft 89 carries a yoke 92 having fingers projecting into a pair of apertures 93 in a portion of the frame 80. By turning the knob 90 the pointer 87, which may be referred to as a limit speed indicator, may be turned to a selected position on the dial 63, the bearing components 84, 85 engaging the frame 80 with sufficient friction to hold the pointer 87 in adjusted position.

*Operation*

When the vehicle is operating, the varying degree of vacuum in intake manifold 12 operates through pressure regulating valve unit 22 to withdraw air from housing 17 at a rate which will maintain a substantially constant subatmospheric air pressure within the housing. Except for possible slight leakage through the speedometer cable 20, the only entrance of air to the interior of housing 17 is by way of inlet filter 73 and nozzle 70. Modern automobiles are equipped with vacuum boosters or other apparatus to insure a certain amount of vacuum at all times to operate conventional equipment, whereby the source of vacuum on such vehicles is always adequate to operate the present device.

Let it be assumed that the limit speed indicator 87 is turned to the 50 mile per hour location on dial 63 as shown in Figure 6. When the speedometer pointer 61 indicates a speed below 50 miles per hour, the semicircular vane 65 is withdrawn from the slot 67 of the sensing unit 66 as shown in full lines in Figure 6. At such time a jet of air under atmospheric pressure issues from nozzle 70 and impinges on the receiving orifice 71 to establish substantially atmospheric pressure in flexible tube 74, conduit 24, and the chamber 29 of servo unit 25. With the air pressure thus substantially balanced on opposite sides of the diaphragm 32, the spring 39 extends the diaphragm outwardly and holds throttle stop 26 out of intercepting position with respect to the foot pedal throttle control member 14 as shown in Figures 1 and 2. Under such conditions, the throttle may be opened freely to its wide open position to accelerate the vehicle.

When the speedometer pointer 61 reaches the preset position of pointer 87, the leading edge of vane 65 passes between the nozzle 70 and orifice 71 to intercept the jet of air from the nozzle as shown in broken lines in Figure 6. Vane 65 is spaced from the opposite walls of slot 67 and does not obstruct either the nozzle orifice 70 or the receiving orifice 71, whereby the latter is no longer exposed to the force of the jet from the nozzle but is placed in free communication with the normal reduced pressure which is maintained within the housing 17. This reduction in pressure at the orifice 17 allows atmospheric pressure acting on plate 33 and the outside of diaphragm 32 of the servo unit 25 to press the diaphragm inwardly against the force of spring 39 and expel a quantity of air from the chamber 29 through the orifice 71 into the housing 17. This temporary additional supply of air in the housing 17 causes a slight rise in pressure in diaphragm chamber 47 of the pressure regulating valve unit 22, lifting the valve member 50 away from port 48 and immediately relieving the excess air to the suction line 23.

As long as speedometer pointer 61 remains at or above the designated speed of 50 miles per hour, the servo unit diaphragm 32 is retracted into the housing 30 to the limit of its movement, raising the throttle stop 26 into intercepting position in relation to the throttle pedal 14. The raising of the throttle stop 26 in the manner described tends to return the throttle pedal 14 to its idling position exerting a force against the foot of the driver.

Upward force applied in the manner described against the driver's throttle foot produces two desirable effects. First, it warns the driver quite forcibly that he is exceeding his self-imposed speed limit. Second, if the driver is so preoccupied or drowsy that he does not consciously notice the warning, the upward force on his throttle foot will act automatically to close the throttle at least partially and reduce the speed of the vehicle, because, although the driver may maintain a steady foot pressure against the throttle pedal, the position of his foot will automatically change to produce the desired reduction in speed without his attention to the matter.

If the foregoing throttle closing action of the present mechanism should occur at some critical time when an unexpected reduction in speed might be dangerous, the resilient character of the servo unit action on throttle stop 26 allows the throttle stop to be overpowered and the throttle opened to any amount desired by merely pressing harder on the pedal 14. The throttle stop is not difficult to overpower but the additional pressure would be tiresome to maintain for a long interval, thereby tending toward the prompt resumption of the selected cruising speed. Whenever there is a necessity for prolonged high speed, the pointer 87 may be turned up to a higher position on the dial.

The force required to overpower throttle stop 26 and move it from its raised position shown in Figure 2a to its lower position shown in Figure 2 is controlled by valve spring 42 on the servo unit 25. When the diaphragm 32 is moved outwardly by overpowering the throttle stop, a sudden reduction in pressure in the chamber 29 resulting from the expansion of its volume causes the new pressure differential between the inside and outside of the chamber to unseat the valve 40 and admit outside air. This will maintain normal operating pressure in housing 17 and servo unit chamber 29 and prevent excessive resistance against overpowering the throttle stop.

It will be apparent to persons skilled in the art that the principles of the invention may be applied in a similar manner to the control member of a steam engine, train, boat, aircraft or other type of mechanism of variable operating characteristics.

Having now described my invention and in what manner the same may be used, what I claim as new and desire to protect by Letters Patent is:

1. A speed reducing device for an automobile having an engine, a speedometer indicator and a throttle member, comprising a housing enclosing said speedometer indicator, means for maintaining subatmospheric pressure in said housing, a sensing unit in said housing comprising aligned nozzle and orifice means, a vane connected with said speedometer indicator for movement into and out of intercepting relation with respect to a jet of air from said nozzle directed toward said orifice, means for adjusting said sensing unit along the path of travel of said vane, a resilient throttle closing member, and pneumatic means connected with said orifice for moving said throttle closing member toward idling position, said throttle closing member being yieldable to the forcible movement of said throttle member thereagainst.

2. A device for limiting the speed of a vehicle having a throttle pedal, comprising a throttle stop mounted under said pedal for relative movement, a diaphragm chamber servo-motor connected with said throttle stop for moving said throttle stop against said pedal, an instrument panel speedometer having means responsive to a predetermined speed of the vehicle for reducing the pressure in said diaphragm chamber to actuate said throttle stop, a spring loaded valve for admitting air into said diaphragm chamber when said throttle stop is overpowered by said pedal, and means for adjusting said first means without interfering with the operation of said speedometer.

3. In a speed limiting device, a housing, means for maintaining an air pressure in said housing below atmospheric, a tachometer mechanism having a shaft and indicating pointer in said housing, a sensing unit having aligned nozzle and orifice means, a pneumatic conduit connecting said nozzle with atmospheric pressure, a control conduit connected with said orifice, a vane on said indicating pointer movable between said nozzle and orifice, means for mounting said sensing unit for arcuate movement concentric with the axis of said shaft without interfering with the movement of said indicating pointer, an indicating pointer on said sensing unit, and an adjusting knob on the exterior of said housing connected with said sensing unit.

4. A speed reducing device for an automobile having an engine, a speedometer indicator and a throttle member, comprising a housing enclosing said speedometer indicator, a suction conduit connecting said housing with a source of suction on said engine, a pressure regulating valve in said conduit, a vane on said speedometer indicator, a sensing unit in said housing comprising a nozzle and receiving orifice on opposite sides of the path of movement of said vane, said orifice lying in the path of an air jet from said nozzle and said vane being adapted to intercept said jet, means for adjusting said sensing unit along the path of movement of said vane without interfering with the movement of said indicator and vane, an atmospheric air inlet for said nozzle, a pneumatic servo-motor operably connected with a throttle stop for said throttle member, and a conduit connecting said servo-motor with said receiving orifice.

5. A device as defined in claim 4 further including a pressure relief valve connected with said servo-motor to admit atmospheric air thereto and permit manual overpowering of said stop by said throttle member.

References Cited in the file of this patent

UNITED STATES PATENTS

| | | |
|---|---|---|
| 1,833,908 | Maybach | Dec. 1, 1931 |
| 2,111,284 | Girl | Mar. 15, 1938 |
| 2,127,454 | Wolfe et al. | Aug. 16, 1938 |
| 2,129,586 | Moller | Sept. 6, 1938 |
| 2,140,458 | Kuskin | Dec. 13, 1938 |
| 2,209,844 | Otto | July 30, 1940 |
| 2,330,654 | Ziebolz | Sept. 28, 1943 |
| 2,347,837 | Morrison | May 2, 1944 |
| 2,397,448 | Todd | Mar. 26, 1946 |
| 2,458,424 | Reynoldson | Jan. 4, 1949 |
| 2,519,859 | Teetor | Aug. 22, 1950 |
| 2,574,700 | Knauss | Nov. 13, 1951 |

FOREIGN PATENTS

| | | |
|---|---|---|
| 494,174 | Great Britain | Oct. 21, 1938 |